United States Patent [19]

Taisne

[11] 3,729,621
[45] Apr. 24, 1973

[54] APPARATUS FOR MEASURING OR INDICATING MOVEMENT BY COMBINED ENCODING AND COUNTING

[75] Inventor: Jean Taisne, Fontenay-sous-Bois, France

[73] Assignee: Societe D'Optique, Precision Electronique Et Mecanique-Sopelem, Paris, France

[22] Filed: July 8, 1971

[21] Appl. No.: 160,731

[30] Foreign Application Priority Data

July 30, 1970 France..........................7028153

[52] U.S. Cl. ........235/92 GC, 235/92 R, 235/92 EV, 235/92 LG, 340/347 P
[51] Int. Cl.............................................H03k 21/04
[58] Field of Search ....................235/92 EV, 92 LG, 235/92 V, 92 GD

[56] References Cited

UNITED STATES PATENTS

| | | | |
|---|---|---|---|
| 3,562,498 | 2/1971 | Darling | 235/92 EV |
| 3,142,121 | 7/1964 | Stefanov | 235/92 GC |
| 3,337,723 | 8/1967 | Etnyre | 235/92 EV |

*Primary Examiner*—Maynard R. Wilbur
*Assistant Examiner*—Robert F. Gnuse
*Attorney*—Cameron, Kerkam & Sutton

[57] ABSTRACT

Relative movement between two members is sensed by a device yielding a signal during successive increments of movement. A first circuit means applies one pulse to a reversible counter for each incremental movement and a second circuit controls the direction of counting to accord with that of movement.

9 Claims, 3 Drawing Figures

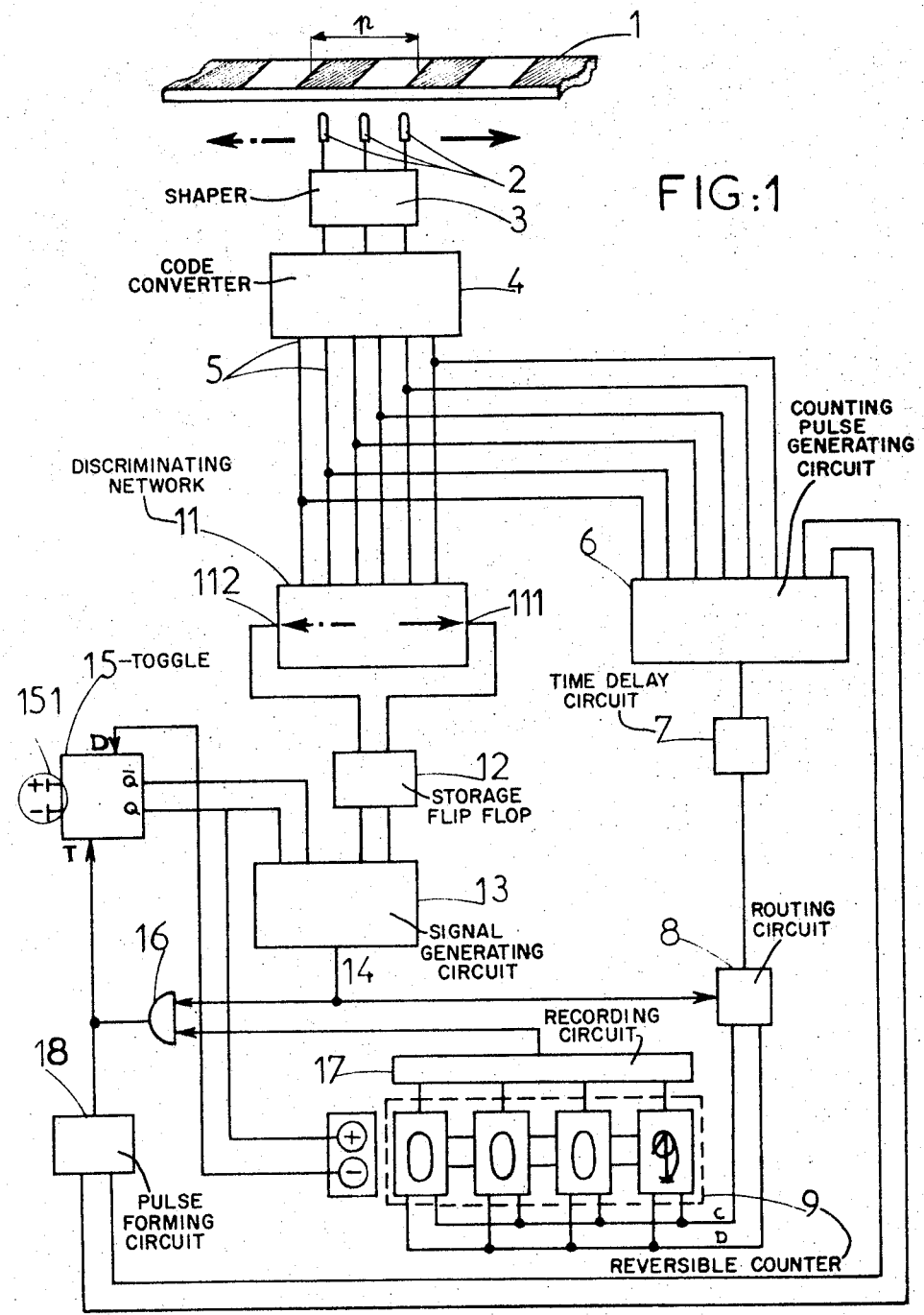
FIG:1

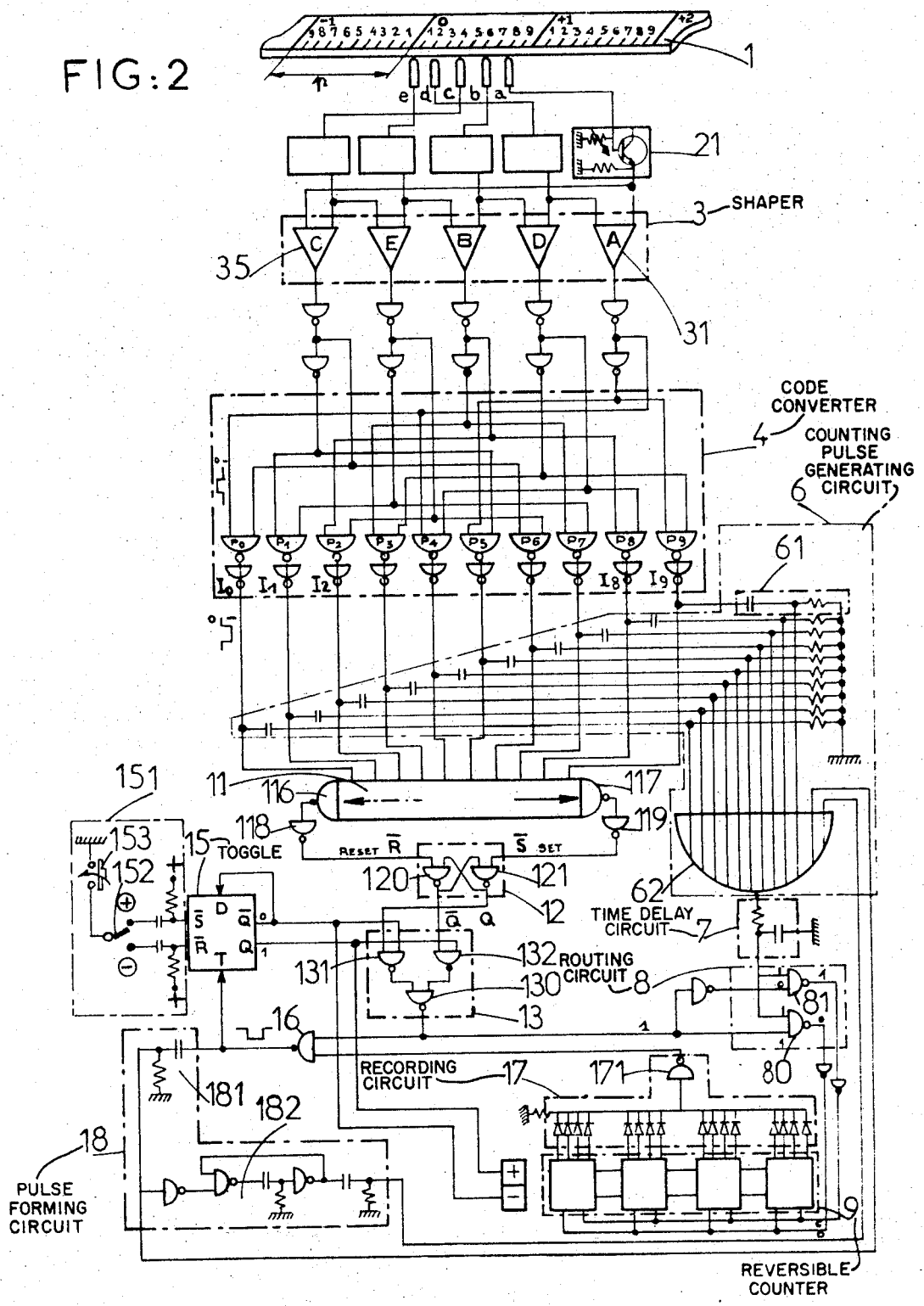
FIG:2

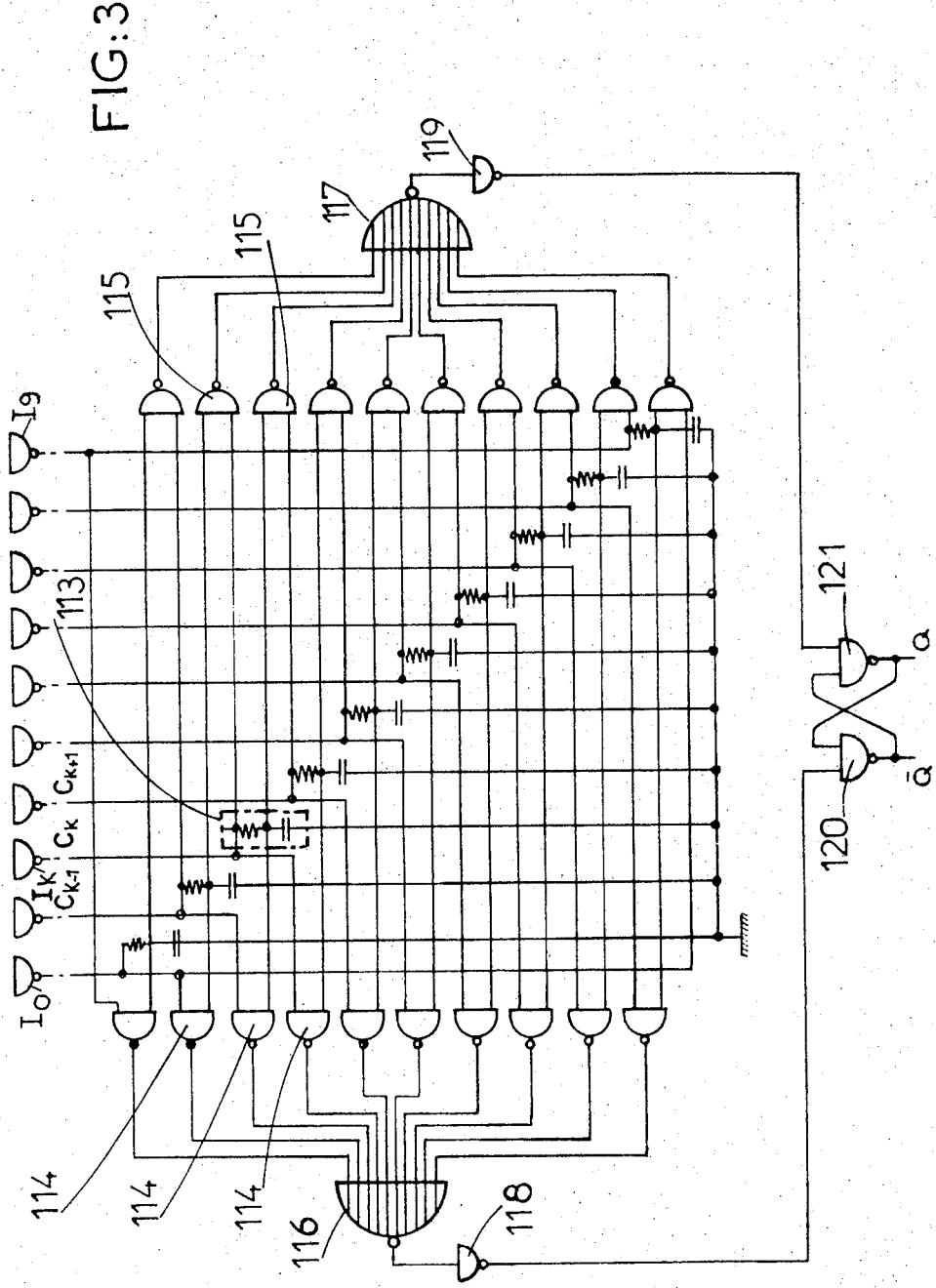

APPARATUS FOR MEASURING OR INDICATING MOVEMENT BY COMBINED ENCODING AND COUNTING

This invention relates to apparatus for measuring or indicating movement by combined encoding and counting, more particularly for indicating the position of one moving part relative to another in numerically controlled machines.

Systems of this type, of course, can use either "absolute" digital measuring methods, in which the position of the moving part is indicated relative to an encoded scale giving a coded indication of each position of a scanning device, or pulse counting methods, which also use a scanning device moving across a graduated scale, but in which the pulses developed by the scanning device as it passes across the graduations of the scale are counted, the total indicated by the counter representing the position for the moving part. To avoid restricting the length of the increment, that is to say, the movement unit which the scanning device can indicate, it has been proposed that both systems should be combined to give combined encoding and counting methods. In such combined systems, the scanning device is composed of a plurality of offset sensors moving across the graduations of the scale and transmitting trains of phase-shifted repetitive signals, these signals being first shaped by comparison with a reference signal and then combined in a code conversion network having $n$ output gates, each of which transmits a "network" signal, each of these network signals $C_1, C_2 \ldots C^N$ comprising in turn, during a movement equal to the pitch of the scale, a square-wave pulse whose width corresponds to one unit of movement.

The square-wave pulses thus provided by one output gate of the code conversion network for every movement of one increment are converted into counting pulses which are summed in a reversible counter. The pulses may be shaped in any known manner in a pulse generating network which, for example by means of a differentiating circuit, will make one counting pulse correspond to each rising slope in the square-wave pulse exhibited by one of the network signals $C_1, C_2 \ldots C_K \ldots C_N$. However, a network for discriminating the direction of movement of the scanning device is also required, so that the pulses are counted, that is, added to the total indicated by the counter, when the scanning device moves across the scale in a direction selected as the positive direction, and are deducted, that is, subtracted from the total indicated by the counter, when the scanning device moves in the opposite or negative, direction.

In general, the direction of movement discriminating network comprises a time-delay circuit for each signal $C_K$, each delayed signal being then compared with the adjacent signals $C_{K-1}$ and $C_{K+1}$ an AND gate. When the scanning device is moved in the positive direction, the signal $C_{K+1}$ exhibits a square-wave pulse and the conjunction of this pulse and of the delayed pulse of the signal $C_K$ supplies a square-wave pulse whose width corresponds to the delay of the signal $C_K$. Similarly, when the scanning device moves in the negative direction, the conjunction of the signals $C_{K-1}$ and $C_K$ produces a square-wave pulse of brief duration. Generally it is the pulses so formed which are fed to set the reversible counter either in the counting direction or in the deducting direction.

A system of this type has the disadvantage that spurious signals may occur at various places in the fairly complicated networks producing the pulses, and the counter may count such a spurious signal in the same way as the pulses produced by movement of the scanning device, so giving a false reading. An object of the invention is to reduce the risk of spurious signals in combined encoding and counting systems. Also, whereas the pulses must be deducted if the scanning device is moving in the negative direction, they must be counted again if the counter passes through zero while the scanning device is still moving in the negative direction. For this reason it is necessary to provide a network for determining the counting direction, so that the position of the zero can be taken into account.

According to the present invention, there is provided apparatus for measuring or indicating movement by encoding and counting, comprising a graduated scale, a travel measuring device having $n$ output gates each providing a unique signal, these unique signals exhibiting in succession during movement equal to one scale pitch a square-wave pulse of which the width corresponds to one increment of movement, a first circuit means for generating one counting pulse for each increment of movement, a second circuit means for determining the direction of counting, and a reversible counter having one input for pulses to be added and another input for pulses to be subtracted and supplying an algebraic value representing the position relative to an origin, of the travel measuring device, said first and second circuit means being connected in parallel between the $n$ output gates of the travel measuring device and a routing circuit which has two outputs connected respectively to the adding and to the subtracting inputs of the reversible counter and which receives on one input the counting pulses produced by the first circuit means and on another input a signal, produced by said second circuit means, controlling the routing of the counting pulses to one input or the other of the counter.

In one embodiment said second circuit means comprises a network for discriminating the direction of movement, a toggle for storing the direction of movement, a manually preset master-slave toggle for storing the sign of the position reading, a circuit operated by the output signals of the toggles for generating a signal controlling the direction of counting, a test circuit for detecting a change to zero of the counter state, the output of the circuit for controlling the direction of counting and that of the test circuit being connected to the inputs of a gate of which the output signal is applied both to cause the sign-storing toggle to change its state and to the input of a circuit capable of forming two phase-shifted supplementary pulses which are arranged to be applied to the input for the counting pulses of said routing circuit.

The system embodying the invention permits a general simplification of the installations normally used while differentiating between the network for shaping the pulses and the network for determining the counting direction.

The invention will now be described in more detail with reference to a particular embodiment, given by way of example and illustrated in the accompanying drawings, in which:

FIG. 1 is a general diagram of a movement measuring system embodying the invention;

FIG. 2 is a diagram representing a preferred embodiment of the invention; and

FIG. 3 is a detail showing the circuit means for determining the counting direction.

FIG. 1 shows part only of a graduated scale 1 provided on one part of the machine, the travel measuring device being on another part movable relative to the first part. The travel measuring device includes a scanning device comprising a plurality of sensors 2 capable of movement relative to the scale 1 either in the positive direction, indicated by a solid arrow, or in the negative direction, indicated by a chain-line arrow. As a result of moving across the graduations of the scale 1 the sensors 2 transmit phase-shifted repetitive signals which are converted, in a known manner, into square-wave signals alternating between two logic levels 0 and 1, by comparison with a reference level, in a shaper 3. The signals so formed are fed to a code converter 4 which combines the shaped signals and supplies at its outputs 5 a plurality of network signals of which each in turn, during a movement of the scanning device equal to the scale pitch $p$, includes a square-wave pulse of which the width corresponds to a movement unit or increment equal to $p/n$, $n$ being the number of outputs 5 of the code converter 4.

The network signals are fed to a counting-pulse generating circuit 6 which produces a short pulse upon the occurrence of a square-wave pulse in any of the network signals.

The pulses so generated are delayed in a time-delay circuit 7 and then fed to a routing circuit 8 which, depending on the condition in which it is set, feeds the pulses either to the forward or adding input C of a reversible counter 9, so that the pulses generated by the network 6 are added as an absolute value to the total which is recorded by the counter 9, and which represents the position reading for the scanning device on the scale, or to the backward or subtracting input D of the counter 9, so that the pulses generated are subtracted as an absolute value from the total recorded by the counter.

The routing direction of the circuit 8 is controlled by a counting direction determining system which comprises, first of all, a direction of movement discriminating network 11, which receives the network signals provided at the outputs 5 from the code converter 4 and combines them to form movement direction pulses in the signals transmitted from its two outputs, of which one corresponds to the direction of positive movement, defined relative to the scale 1 and represented on the diagram by a solid arrow, and the other to the negative movement direction, represented by a chain-line arrow.

The signals from the two outputs of the movement direction discriminating network are stored in a movement direction storage flip-flop 12 which transmits two signals, of mutually opposite sign to a circuit 13 for generating a signal controlling the direction of counting, this signal being transmitted from the output of circuit 13 and applied to operate the routing circuit 8. The circuit 13 also receives the mutually opposite signals transmitted by a toggle 15 for storing the sign of the position reading displayed by the add-subtract counter 9. The toggle is preferably a D-type master-slave bistable trigger circuit with an input 151 for manual presetting of the sign, two inputs Q and $\overline{Q}$ opposite to one another, an input D in response to a signal at which the signal from the output $\overline{Q}$ is set, and an input T for causing the toggle to change its state, the signal set at the input D passing to the output Q whenever a rising slope is fed to the input T.

The signal applied to the input T is transmitted by an AND gate 16 of which the inputs receive respectively the routing direction controlling signal from the output 14 of the circuit 13 and a signal transmitted by a test circuit 13 for detecting a change to zero in the position reading displayed by the counter 9.

Visual indicators connected to the outputs Q and $\overline{Q}$ of the flip-flop 15 can be arranged to display a positive or a negative arithmetic operator in front of the position reading, as appropriate.

Whenever a pulse is transmitted from the output of the gate 16, a circuit 18 forms two supplementary pulses and these supplementary pulses are added to the pulses formed by the generating circuit 6 and are therefore counted like counting pulses.

In the system above described, the counting pulses are formed independently of the determination of the counting direction. This prevents any spurious signals which may be formed in the counting direction determining network from being counted as counting pulses, and the risk of such interfering pulses being recorded is greatly reduced. Also, the system just described provides a simple solution to the problem of the position reading changing to zero. Assuming that the position reading displayed is positive when movement takes place relative to zero in the positive direction indicated by the solid arrow, and negative when movement takes place relative to zero in the negative direction indicated by the chain-line arrow, the pulses produced by the movement of the scanning device must be subtracted if the initial reading is positive and movement is in the negative direction, until zero is reached. When zero has been passed, however, the sign displayed must change and also the pulses previously subtracted must be added, the absolute value of the reading now increasing. Also, while movement was in the negative direction, the digit due to appear after the zero should have been a 9. When the readings become negative, the 9 should be replaced by a 1, so that two supplementary pulses must be transmitted.

The system embodying the invention does this in a very simple fashion.

First of all, a sign corresponding to the sign selected for the readings to right or to left of the zero is preset manually by means of the control 151.

The discriminating network 11 transmits a pulse, for every movement of one increment, at one or other of its outputs 111, 112, corresponding respectively to positive and to negative movement.

If the initial reading is positive and movement is in the positive direction, the signals developed at the outputs of the flip-flop 12 do not change, and for every movement by one increment the circuit 13 transmits a signal to operate the routing circuit 8 in the counting direction. The counting pulses generated by the network 6, which have been delayed by the circuit 7 so that routing can be effected, are thus caused to operate counter 9 in the counting direction.

If movement is in the negative direction, on the other hand, the output 112 transmits a pulse, which changes over the toggle 12 and inverts the signals developed at the outputs of this toggle so that the signal from the output 14 of the circuit 13 reverses the routing circuit 8, the delayed counting pulses then being caused to operate the counter 9 in the negative direction. If movement continues in the negative direction, the signal from the output 14 remains the same until zero is reached.

The circuit 17 has recorded the successive changes to zero of the decades stages of the counter 9. When the last decade changes to zero, the signal from the circuit 17 is inverted and the gate 16 transmits a pulse which is fed to the input T of the toggle 15, so that the signals provided at the outputs Q and $\overline{Q}$ are inverted. If movement still continues in the negative direction, the signals from the toggle 12 remain the same so that, at the time the toggle 15 changes its state, the circuit 13 transmits from its output 14 a signal which moves the routing circuit 8 into the counting condition. At the same time the signal from the output of the gate 16 is converted by the circuit 18 into two phase-shifted counting pulses which are added to the pulses generated by the circuit 6, so that, as already described, the digit displayed by the counter, which in a decimal system will have become a 9, changes to 1.

FIGS. 2 and 3 illustrate a particular embodiment of the networks and circuits used in a system according to the invention.

The scale 1, provided with graduations having a pitch $p$, may be of any type, for example optical or magnetic. The scanning device 2 comprises, for example, five cells $a, b, c, d, e$ which, in the case of an optical scale, may receive the light transmitted through the scale 1, each cell being situated behind an individual slot in a screen (not shown). Obviously, any reading system may be used, for example a system using moiré effects.

As the cells $a$ to $e$ pass across the graduations of the scale 1, the signals which they develop pass first to conventional impedance matchers 21 of which only one is shown in detail, and which supply signals of identical amplitude.

It is essential to the operation of the invention for the signals to be properly in phase. For this reason it is particularly advantageous to shape the signals by comparing them with one another. The shaper 3 therefore comprises five comparators 31, 32, 33, 34 and 35 in which each signal developed by a cell is compared with a signal developed by another of the cells. In the embodiment illustrated the signal $a'$ from the cell $a$ is compared with the signal $d'$ from the cell $d$ in the comparator 31 to give a shaped signal A corresponding to $a' - d'$. Similarly, shaped square-wave signals B to E are shaped from the signals developed by the cells $a$ to $e$.

The system shown in FIG. 2 will use a NAND logic element formed, therefore, by NAND gates supplying a "0" logic signal when they receive "1" logic signals at their two inputs and supplying a "1" logical signal in all other circumstances.

The signals A to E and their inverses $\overline{A}$ to $\overline{E}$ shaped by inverters 33 are fed to a code conversion matrix 4 formed of a plurality of inverters and NAND gates and producing the combination of signals shown in the following truth table:

| Signal | A | B | C | D | E | Coding |
|---|---|---|---|---|---|---|
| 0 | 0 | 0 | 0 | 1 | 1 | $\overline{AC}$ |
| 1 | 0 | 0 | 1 | 1 | 1 | CE |
| 2 | 0 | 0 | 1 | 1 | 0 | $\overline{BE}$ |
| 3 | 0 | 1 | 1 | 1 | 0 | BD |
| 4 | 0 | 1 | 1 | 0 | 0 | $\overline{AD}$ |
| 5 | 1 | 1 | 1 | 0 | 0 | AC |
| 6 | 1 | 1 | 0 | 0 | 0 | $\overline{CE}$ |
| 7 | 1 | 1 | 0 | 0 | 1 | BE |
| 8 | 1 | 0 | 0 | 0 | 1 | $\overline{BD}$ |
| 9 | 1 | 0 | 0 | 1 | 1 | AD |

Each of the output gates $P_0 \ldots P_K \ldots P_9$ of the code conversion network provides a network signal, which is normally at level 1 and which falls to level 0 during movement of the scanning device through an increment equal to one-tenth of the pitch.

It is easy to verify, for example, that the gate $P_0$, whose inputs receive the signals $\overline{A}$ and $\overline{C}$, is at the 0 level when the scanning device is between 0 and 1. A 1-in-10 code is therefore provided, enabling ten increments to be distinguished within one track pitch.

As a NAND logic is being used, each gate $P_0$ to $P_9$ is followed by an inverter $I_0$ to $I_9$, each inverter in turn producing a square-wave signal of level 1 of which the duration corresponds to a movement of one increment.

The pulse generating network is made up of nine conventional differentiating circuits such as 61, each connected to the output of an individual one of the inverters $I_0$ to $I_9$ and supplying a brief positive pulse for every rising slope in the signal developed by the associated gate.

These counting pulses are fed to a multi-input OR gate 62 with 10 inputs and are delayed in a time-delay circuit 7, of which the time constant is selected so that routing can be initiated before the pulse arrives.

The network signals $C_0$ to $C_9$ developed at the outputs of the inverters $I_0$ to $I_9$ during successive ones of the submultiple increments of movement are fed to a movement direction discriminating circuit 11 shown in detail in FIG. 3. Each signal $C^K$ developed during one of the submultiple increments of movement is fed directly to an input of two of the NAND gates 114, 115 and is also delayed in a conventional time-delay circuit such as 113. The signal $C^{K'}$ so delayed is fed both to the second input of that gate 114 which receives the undelayed signal $C_{K-1}$ developed during the preceding one of the submultiple increments of movement and to the second input of that gate 115 which receives the undelayed signal $C_{K+1}$ developed during the succeeding one of the submultiple increments of movement; K is taken as increasing from 0 to 9 in the positive direction of movement of the scanning device. The gates 114 are connected to the inputs of a multiple-input NOR gate 116 followed by an inverter 118, and the gates 115 are connected to the inputs of a multiple-input NOR gate 117 followed by an inverter 119. It will be appreciated that the inverters 118, 119 normally transmit signals of level 0 when the scanning device is between the two boundaries of an increment; when movement is in the positive direction, one of the gates 115 records the conjunction of the signals $C_K$ and $C_{K+1}$ at the instant the boundary between two consecutive increments is traversed and at this instant transmits a "0" pulse of which the width is regulated by the time constant of the associated timeedelay circuit 113. The gate 117 therefore develops a "1" pulse which is converted by the inverter 119 into a "0" pulse of equal width. Similarly, when movement is in the negative direction, the gate 118 transmits a "0" pulse of which the width is determined by the time constant of the time-delay circuit 113, whenever the boundary between two successive increments is passed.

The signals from the outputs of the inverters 118, 119 are fed respectively to the RESET ($\bar{R}$) and SET ($\bar{S}$) inputs of a bistable trigger or toggle composed of two NAND gates 120, 121, whose outputs yield mutually opposed signals Q and $\bar{Q}$, and operating as shown in the following truth table:

| RESET $\bar{R}$ | SET $\bar{S}$ | Q | $\bar{Q}$ |
|---|---|---|---|
| 0 | 1 | 0 | 1 |
| 1 | 0 | 1 | 0 |
| 1 | 1 | $Q_{n-1}$ Previous state | $\bar{Q}_{n-1}$ |

As this table shows, the toggle remains in its previous state when the SET and RESET inputs receive "1" signals, that is to say, when the scanning device is between the two boundaries of an increment. If, however, the RESET input receives a "0" signal, that is, if the boundary between two increments is passed during movement in the negative direction, the output Q yields a "0" signal and the output $\bar{Q}$ a "1" signal.

The toggle 15 for memorizing the sign of the position reading is a d-type master-slave bistable trigger (or "-flipflop") shown diagrammatically in FIG. 2 and having two outputs Q and $\bar{Q}$ producing mutually inverted signals, and an input 151 at which the sign can be preset manually. After selection of the origin of the scale, corresponding to the zero position reading, by means of a conventional circuit for presetting the counter 9, therefore, the operator (+) can be displayed if the scanning device is in a position to the right of the origin. It is necessary only to move the selector 152 to the (+) position and to press the button 153 to produce a "0" pulse at the SET input and thus to change the output Q to "1," the toggle 15 operating as shown in the truth table just given for toggle 12. For positive positions, that is, the output Q of the toggle 15 transmits a "1" signal and the output $\bar{Q}$ a "0" signal.

The signal controlling the routing direction is transmitted by a NAND gate 130 receiving the signals transmitted by two NAND gates 131, 132. The gate 131 receives the signals from the output Q of the toggle 12 and from the output $\bar{Q}$ of the toggle 15, and the gate 132 receives the opposite signals from the output Q of the toggle 15 and from the output $\bar{Q}$ of the toggle 12. When the initial reading is positive and movement is in the positive direction, therefore, the SET input of the toggle receives the "0" signals when the RESET input remains at "1." The outputs Q and $\bar{Q}$ of the toggle 12, like the outputs Q and $\bar{Q}$ of the toggle 15, respectively provide "1" and "0" signals, and the toggle 130, receiving "1" signals at both its inputs, provides a "0" signal. Similarly, as will be appreciated, the gate 130 provides a "1" signal when the initial reading is positive and movement is in the negative direction. As a result, if the routing direction control signal is a "0", the reversible counter must add the pulses, whereas when the signal provided by the gate 130 is a "1," the counter must subtract the pulses.

The routing circuit 8 therefore comprises two NAND gates 80, 81, each of which receives at one input the pulses from the pulse generating network and at the other input either (in the case of the gate 80) a signal directly transmitted from the output of the gate 130 or (in the case of the gate 81) this signal inverted. When movement is in the positive direction, therefore, the gate 81 always receives a "1" signal at one input, and it transmits a "0" signal whenever it receives a "1" counting pulse from the output of the time-delay circuit 7. The signal so transmitted is re-inverted and fed to the counting input of the counter 9. Conversely, when movement is in the negative direction, the gate 80 always receives a "1" signal at one input and it transmits a "0" signal whenever it receives a pulse from the output of the time-delay circuit 7. It then transmits a "0" signal which is inverted and fed to the deducting input of the counter 9. Clearly, no interference spurious signal occurring in the pulse direction discriminating network can be confused with the counting pulses, because it is only during the brief instant when a "1" counting pulse appears at an input of the gates 80 or 81 that that one of these gates whose other input is at the 1 level transmits a signal which is effective upon the counter 9.

When the initial reading is positive and movement is in the negative direction, the decades of the counter 9 change successively to 0.

The test circuit 17 is formed of an inverter 171 connected to all the outputs of the decades of the counter 9 by way of diodes which prevent pulses passing from one counter to another, the common line being earthed by way of a resistor. As long as any one or more of the decades in the counter 9 is not at "0," therefore, the inverter 171 transmits a "0" signal. When the scanning device passes through the position of the origin, however, the first decade in the counter 9 changes to zero in its turn, and the output of the inverter 171 changes to "1."

The signals appearing at the outputs of the test circuit 17 and of circuit 13 are fed to a NAND gate 16. As long as the counter is not at 0, the input of the gate 16 connected to the test circuit receives a "0" signal and the gate 16 therefore transmits a "1" signal. When movement is in the negative direction and the origin is crossed, both inputs of the gate 16 receive a "1" signal and the output signal changes to "0," exhibiting a descending slope.

If movement continues in the negative direction, the pulse generating network provides a pulse which tends to change the first decade in the counter to 9. The signal transmitted by the gate 171 returns to "0" and the signal at the output from the gate 16 returns to "1," exhibiting a rising slope.

This rising slope is converted by a differentiating circuit 181 into a pulse which is fed directly to the input of the gate 62 of the pulse generating network and is also converted by a monostable circuit 182 into a second phase-shifted pulse also fed to the input of the gate 62, the phase-shift being regulated by the time constant of the monostable circuit 182. The counter therefore receives two supplementary pulses, so that it displays a 1 instead of the 9.

At the same time the signal of rising slope produced at the output of the gate 16 is fed to the T input of the toggle 15 and causes the latter to change its state. The "0" signal from the output $\overline{Q}$, set by an input signal at the input D, now passes to the output Q, the output $\overline{Q}$ then changing to 1. The operator now displayed is therefore negative. As movement continues in the negative direction, the outputs Q, $\overline{Q}$ of the toggle 12 remain at the "0" and "1" levels respectively, and the gate 130 transmits a "0" signal which, inverted into a "1" signal and fed to the gate 81, reverses the routing, and the two delayed supplementary pulses produced by the circuits 181, 182 are therefore counted, with the result that the digit 9, which should have been displayed by the first decade of the counter, changes to 1. Similarly, the following pulses are counted if movement continues in the negative direction.

Clearly, if the initial reading is negative and movement is in the positive direction, the pulses are at first subtracted. Then, when the scanning device passes the origin, the sign of the reading is changed at the same time as the routing 8 is reversed, the pulses being counted again.

By means of the system just described, which uses a small number of simple circuits, therefore, it is easy to select the origin of a measurement and the sign of the readings displayed, the counting of the pulses by the counter being merely delayed, at the time the origin is reached, by a negligible time long enough to reverse the counting direction and the sign of the reading displayed.

Also, since the counter can only take into account counting pulses shaped in a simple circuit connected in parallel with the circuit determination of the counting direction, the risk of interference being recorded is greatly reduced.

Obviously, the invention is not restricted to the details of the embodiments just described, and in particular equivalent systems might be substituted for the circuits and toggles described by way of example. Although all the systems described use a NAND logic, any other logic could, of course, be used.

Similarly, the scanning device has been described diagrammatically by way of example, but might be replaced by any other device providing one pulse for each one increment of movement. The signal shaper and the code conversion network may, of course, be replaced by any equivalent system. However, since the signals used must be perfectly in phase, it is particularly advantageous to use the shaper described, in which each signal is compared with a signal developed by another detector. The signal transmitted by each detector can be compared with a combination of signals transmitted by two of the other detectors so that the scale pitch, of course, can be subdivided into a larger number of increments, whereupon the counting system just described can easily be used merely by increasing the number of inputs in the pulse generating network and in the movement direction discriminating network.

I claim

1. Apparatus for measuring or indicating movement by encoding and counting, comprising a graduated scale, a travel measuring device having $n$ output gates each providing a unique signal, these unique signals exhibiting in succession during movement equal to one scale pitch a square-wave pulse of which the width corresponds to one increment of movement, a first circuit means for generating one counting pulse for each increment of movement, a second circuit means for determining the direction of counting, and a reversible counter having one input for pulses to be added and another input for pulses to be subtracted and supplying an algebraic value representing the position relative to an origin, of the travel measuring device, said first and second circuit means being connected in parallel between the $n$ output gates of the travel measuring device and a routing circuit which has two outputs connected respectively to the adding and to the subtracting inputs of the reversible counter and which receives on one input the counting pulses produced by the first circuit means and on another input a signal, produced by said second circuit means, controlling the routing of the counting pulses to one input or the other of the counter wherein said second circuit means comprises a network for discriminating the direction of movement, a toggle for storing the direction of movement, a manually preset master-slave toggle for storing the sign of the position reading, a circuit operated by the output signals of the toggles for generating a signal controlling the direction of counting, a test circuit for detecting a change to zero of the counter state, the output of the circuit for controlling the direction of counting and that of the test circuit being connected to the inputs of a gate of which the output signal is applied both to cause the sign-storing toggle to change its state and to the input of a circuit capable of forming two phase-shifted supplementary pulses which are arranged to be applied to the input for the counting pulses of said routing circuit.

2. Measuring or indicating apparatus in accordance with claim 1, wherein said first circuit means comprises $n$ respective differentiating circuits for the signals developed at the outputs of the movement measuring device, each of said differentiating circuits being connected between one of the said outputs and a respective input of a multiple-input OR gate of which the output is connected by way of a time-delay circuit to the counting-pulse input of the routing circuit.

3. Measuring or indicating apparatus in accordance with claim 2, wherein each said differentiating circuit is arranged to develop a brief counting pulse whenever the signal transmitted by the corresponding output of the travel measuring device includes a rising slope.

4. Measuring or indicating apparatus in accordance with claim 2, wherein the output of the circuit for forming said two supplementary pulses is connected to the input of said multi-input OR gate in said first circuit means.

5. Measuring or indicating apparatus in accordance with claim 1, wherein each of the $n$ unique signals comprises a distinctive signal portion developed during a unique $1/n$ submultiple portion K of the scale pitch, where K increases from 1 to $n$ during positive movement, and said second circuit means includes an individual delay circuit for equally delaying each of said unique signals, $n$ AND gates each fed with an undelayed one of said unique signals and with the delayed unique signal developed during a preceding submultiple increment of movement the outputs of all said $n$ AND gates being connected to respective inputs of a multiple-input OR gate yielding at its output a signal denotive of movement in one direction, and $n$ further AND gates each fed with an undelayed one of said unique signals and with the delayed unique signal developed during the succeeding increment of movement, the outputs of all said further AND gates being connected to respective inputs of a further multi-input OR gate yielding at its output a signal denotive of movement in the other direction.

6. Measuring or indicating apparatus in accordance with claim 5, wherein said toggle for storing the direction of movement comprises two NAND gates, each receiving both the signal from the output of the other of said NAND gates and also, in the case of said gate said signal denotive of positive movement signal and, in the case of the other gate, said signal denotive of negative movement, the signals provided at the outputs of the gates being mutually inverted.

7. Measuring or indicating apparatus in accordance with claim 5, wherein the circuit for generating the signal controlling the direction of counting comprises two NAND gates, one receiving the signal denotive of positive movement from the toggle storing the direction of movement and the positive signal from the sign-storing toggle and the other receiving from each of said toggles signals denotive respectively of negative movement and of negative sign, the outputs of the two NAND gates being connected to the input of a further NAND gate of which the output is connected to the input of the routing circuit.

8. Measuring or indicating apparatus in accordance with claim 1, wherein the toggle storing the sign of the position reading is a master-slave bistable circuit with two inputs for manual presetting of a sign, a positive output and a negative output, a setting input connected to the negative output and an input for a signal causing the toggle to change its state.

9. Measuring or indicating apparatus in accordance with claim 1, wherein the circuit for forming said two pulses comprises a first time-delay circuit arranged to delay the signals which are applied to cause a change of state of the sign-storing toggle, the output of said delay circuit being connected directly to an individual input of the multiple-input OR gate of said first circuit means, and also, by way of the series combination of an inverter, a monostable flipflop and a second time-delay circuit, to another individual input of said multiple-input OR gate.

* * * * *